US005968225A

United States Patent [19]

Ishii et al.

[11] Patent Number: 5,968,225

[45] Date of Patent: Oct. 19, 1999

[54] HYDROGEN STORAGE ALLOY POWDER AND AN ELECTRODE COMPRISING THE SAME

[75] Inventors: Masatoshi Ishii; Hiroyuki Miyamoto, both of Takefu; Genji Noguki; Hajime Kitamura, both of Ibaraki-ken, all of Japan

[73] Assignee: Shin-Etsu Chemical Co., Ltd., Tokyo, Japan

[21] Appl. No.: 08/972,249

[22] Filed: Nov. 18, 1997

[30] Foreign Application Priority Data

Nov. 18, 1996 [JP] Japan .................................... 8-321181
Aug. 29, 1997 [JP] Japan .................................... 9-249625

[51] Int. Cl.$^{6}$ ...................................................... H01M 4/38

[52] U.S. Cl. .......................... 75/255; 420/900; 429/218.2

[58] Field of Search .............................. 75/255; 420/900; 428/547, 558; 429/218.2

[56] References Cited

U.S. PATENT DOCUMENTS 3,883,346 5/1975 Martin .................................... 420/900
5,338,333 8/1994 Uda et al. .............................. 420/900

FOREIGN PATENT DOCUMENTS 0 696 823 2/1996 European Pat. Off. .
04-137361 5/1992 Japan .
06-150919 5/1994 Japan .
07-073880 3/1995 Japan .
08-067936 3/1996 Japan .

*Primary Examiner*—George Wyszomierski
*Attorney, Agent, or Firm*—McDermott, Will & Emery

[57] ABSTRACT

A powder of a hydrogen storage alloy which comprises metallic nickel in or on the surfaces of the powder in an amount sufficient to impart a magnetization intensity of 0.5 to 6 emu/g to the powder. The powder has a specific surface area of 0.15 to 0.7 $m^2/g$ when determined according to a BET adsorption method, an oxygen concentration of 0.15 to 1.5 wt %, and an average particle size of 10 to 100 $\mu m$, with a size distribution wherein the content of particles having a size of 8 $\mu m$ or below is in the range of 30 wt % or below. An electrode for secondary cells is also described, which comprises the powder defined above.

8 Claims, No Drawings

HYDROGEN STORAGE ALLOY POWDER AND AN ELECTRODE COMPRISING THE SAME

BACKGROUND OF THE INVENTION

1. Field of the Invention

This invention relates to a hydrogen storage alloy powder, and more particularly, to an improved hydrogen storage alloy powder adapted for use as a negative electrode of nickel-hydrogen secondary cells. The invention also relates to an electrode made of such a hydrogen storage alloy powder and exhibiting good low temperature and high-rate discharge characteristics.

2. Description of the Prior Art

After the discovery of hydrogen storage alloys capable of storing or occluding and releasing hydrogen, they have had wide utility not only in the field of hydrogen storage, but also in the field of cells or batteries. Especially, their application to alkaline secondary cells has now been put into practice, and successive improvements of hydrogen storage alloys have been made therefor.

For instance, a $LaNi_5$ alloy, which was initially developed and has a $CaCu_5$ crystal structure, has been improved by replacing part of La with a rare earth element such as Ce, Pr, Nd or the like and part of Ni with a metal element such as Al, Co, Mn or the like, thereby realizing a higher capacity and a longer life of the alloy.

However, where it is intended to improve a discharge capacity at temperatures of 0° C. or below, there is the tendency that the life of an electrode using such an alloy is shortened. Thus, it has been very difficult to obtain a nickel-hydrogen secondary cell whose negative electrode has both good low temperature characteristics and long life. Moreover, these alloys are not satisfactory with respect to a high-rate discharge characteristic. Thus, nickel-hydrogen secondary cells having a satisfactory high-rate discharge characteristic have never been known in the art.

SUMMARY OF THE INVENTION

In order to solve the problems of the prior art hydrogen storage alloys, we have made intensive studies on hydrogen storage alloy powder. As a result, it has been found that a powder which is made of a hydrogen storage alloy and which has defined ranges of a magnetization intensity, a specific surface area and an oxygen concentration exhibits good capability of storing and releasing hydrogen at low temperatures and a great storing or releasing capacity of hydrogen per unit weight of the alloy powder. When this powder is employed as a negative electrode of nickel-hydrogen secondary cells, the discharge characteristic and high-rate discharge characteristic of the cell at low temperatures can be improved without lowering the capacity and life of the cell.

It is accordingly an object of the invention to provide a powder of a hydrogen storage alloy which exhibits good capability of storing and releasing hydrogen at low temperatures and a great hydrogen storing or releasing capacity per unit weight of the powder.

It is another object of the invention to provide an electrode of nickel- hydrogen secondary cells which has good low temperature and high-rate discharge characteristics.

The above objects can be achieved, according to the invention, by a powder which is made of a hydrogen storage alloy and wherein the powder has metallic nickel in or on the surfaces thereof in an amount sufficient to impart a magnetization intensity of 0.5 to 6.0 emu/g thereto, the powder having a specific surface area of 0.15 to 0.7 $m^2/g$ when determined according to a BET adsorption method, an oxygen concentration of 0.15 to 1.5 wt %, and an average particle size of 10 to 100 $\mu$m, with a size distribution wherein the content of particles having a size of 8 $\mu$m or below is in the range of 30 wt % or below.

DETAILED DESCRIPTION OF THE INVENTION

The hydrogen storage alloy used in the practice of the invention is not critical with respect to the type thereof and may be any of known hydrogen storage alloys ordinarily employed as a negative electrode of secondary cells. Examples of such hydrogen storage alloys include Ti-based hydrogen storage alloys of the formula, ABn, wherein A represents Ti or Zr and B represents Fe or Mn, and n is a value of 1 to 2, Zr-based hydrogen storage alloys of the formula, A'B'z, wherein A' represents Zr or Ti, B' represents Ni or V, and z is a value of 1 to 2, and a rare earth element-based hydrogen storage alloys of the formula, $A''B''_5$, wherein A" represents Ca, Ce, Nd or Pr, B" represents Ni, Al, Co or Mn.

Of these, $MmNi_5$-based hydrogen storage alloys are preferred from the standpoint that when they are applied to as secondary cells, a good cycle life is attained. In the alloys, Mm is a Misch metal consisting of a mixture of rare earth element such as La, Ce, Pr and Nd. From the standpoint that the cycle life is further improved, part of Ni in the $MmNi_5$ hydrogen storage alloys should preferably be replaced by Al and also by Mn. Further, Ni should more preferably be partly replaced by Co.

Most preferably, the hydrogen storage alloys used in the present invention are those represented by the general formula, $(La)_xR_{1-x}(Ni_aM_b)$, wherein R represents at least one member selected from Ce, Pr and Nd, M represents at least one member selected from Al, Co, Cu, Fe, Mn, Ti and Zr, x is a value of from 0.2 to 1, (a+b) is a value of from 4.0 to 6.0 provided that b is such that $0<b\leqq 2.0$.

The magnetization intensity of the hydrogen storage alloy powder of the invention should be in the range of 0.5 to 6.0 emu/g, preferably from 1.0 to 3.0 emu/g. If the magnetization intensity is less than 0.5 emu/g, the surface activity of the powder lowers, thereby not attaining intended characteristics. More particularly, good discharge capacity and life cycle cannot be expected. On the other hand, when the magnetization intensity exceeds 6.0 emu/g, a storage and release reaction of hydrogen is facilitated when the powder is applied to as an electrode. However, where metallic nickel is developed in or on the surfaces thereof by a wet surface treatment as will be described hereinafter, Al and rare earth elements are more liable to dissolve, so that an amount of hydrogen to be stored lowers, with the lowering of a discharge capacity.

The specific surface area of the alloy powder of the invention is determined according to the BET adsorption method and is in the range of from 0.15 to 0.7 $m^2/g$, preferably from 0.2 to 0.6 $m^2/g$. When the BET specific surface area is larger than 0.7 $m^2/g$, the surfaces are so active that the powder is prone to deactivate through oxidation when the powder is used to make an electrode. The deactivation leads to a reduced effective area of an electrode reaction, thereby causing a discharge characteristic to lower. In this case, the active surfaces are oxidized, and an amount of oxygen increases along with an increasing BET specific surface area, but the magnetization intensity decreases.

Where the BET specific surface area is smaller than 0.15 $m^2/g$, the reaction area becomes small, under which even if the surfaces are highly active, a discharge characteristic does not increase.

As a matter of course, the specific surface area can be increased by dividing the alloy into finer particles. The use of finer particles leads to a reduced discharge capacity and a shortened life. To avoid this, it is essential in the practice of the invention that the average particle size be in the range of from 10 to 100 $\mu$m and that a size distribution be such that the content of particles having a size of 8 $\mu$m or below is in the range of 30 wt % or below.

If the average particle size is smaller than 10 $\mu$m, the discharge capacity lowers with a shortened life. On the other hand, when the average particle size exceeds 100 $\mu$m, the amount of fine particles is reduced but the BET specific surface area is also reduced. In order to attain a specific surface area of not smaller than 0.15 $m^2/g$, the surface treatment has to be carried at higher temperatures over a longer time, thus being unsuitable for practical applications. Moreover, such a surface treatment causes Al or rare earth elements to be dissolved out in excess, resulting in the lowering of a discharge capacity. In the practice of the invention, it is preferred that the average particle size is in the range of 10 to 70 $\mu$m.

When the alloy powder of the invention is active on the surfaces thereof and has a satisfactory BET specific surface area, the content of oxygen on or in the surfaces thereof increases. In practice, the oxygen concentration is in the range of 0.15 to 1.5 wt %, preferably 0.2 to 0.8 wt %. If the alloy surfaces are oxidized, the oxygen concentration increases. In this case, the surfaces becomes inert, and the magnetization intensity lowers. In addition, the oxygen concentration increases when the powder is divided in the form of finer particles. This is not advantageous for the reason set out above.

In the practice of the invention, it is essential that the hydrogen storage alloy powder have active metallic nickel in or on the surfaces thereof in order to control a magnetization intensity ranging from 0.5 to 6.0 emu/g.

How to cause active metallic nickel to exist in or on the power surfaces is not critical although the manner of treatment of alloy depends on whether or not alloys used contain nickel therein.

When alloys used contain nickel therein such as $MmNi_5$ alloys, alloy powder is preferably subjected to wet treatment with a solution of an alkali such as NaOH, KOH, LiOH or the like or an acid such as HCl, $H_2SO_4$, $HNO_3$ or the like. When using a solution of an acid or an alkali, treating conditions include a mixing ratio by weight of an acid or alkali and an alloy powder of 1:2 to 4:1 by volume, a treating temperature of from room temperature to 150° C., a treating time of from 0.1 to 10 hours. For the treatment, an acid or alkaline solution and an alloy powder at a given ratio are mixed, agitated at the above-defined temperature for the defined time and dried by any known manner. For this purpose, it is preferred to use a 1 to 10N alkali solution or a 0.05 to 1N acid solution.

From the standpoint of the treatment in an efficient and simple manner, it is more preferred to treat alloy powder with a solution containing a highly conjugated unsaturated compound.

The highly conjugated unsaturated compounds used in the present invention include aromatic compounds or heterocyclic compounds having at least five conjugated n bonds in one molecule. The term "conjugated π bonds" used herein means two or more double and/or triple bonds which are in conjugated relation with each other.

The molecular weight of these highly conjugated unsaturated compounds used in the practice of the invention should preferably be 100 or over, more preferably in the range of 200 to 50,000.

Aromatic compounds having five or more conjugated π bonds include, for example benzene derivatives such as Safranine B, Rosaniline, Methyl Violet, Methylene Blue and the like, naphthalene derivatives such as Solvent Black 3, thio-β-naphthol, 1,8-diaminonaphthalene-paraquinone and the like, polynuclear aromatic compounds such as 1-aminonathracene, a-phenylanthacene and the like, quinones such as Naphthyl Blue, alizarinquinone and the like, and benzene ring-free aromatic compounds such as azulene, cyclo[3,2,2]azine ( ) and the like. Examples of heterocyclic compounds having five or more conjugated π bonds include oxygen-containing heterocyclic compounds such as 2,4-diphenylfuran, benzofuran and the like, nitrogen-containing heterocyclic compounds such as Nile Blue A, Methylene Blue, Acid Black 2, Solvent Black 5, quinoxaline and the like, sulfur-containing heterocyclic compounds such as indioron, dibenzothophene and the like, and bicyclic compounds wherein a nitrogen atom or atoms are shared, such as 2-phenylpyrroccoline, tricycleadine and the like, and alkaloids such as evoxanthine, flindersine and the like. These compounds may be used singly or in combination.

For the treatment, alloy powder and a solution containing a highly conjugated unsaturated compound are mixed in an amount of 0.01 to 10 wt % of the compound at a temperature ranging from room temperature to 130° C. for a time of 0.1 to 10 hours under agitation, and dried.

The solution containing such a conjugated unsaturated compound may be in the form of an acidic or alkaline solution. The acids used for this purpose include, for example, hydrochloric acid, sulfuric acid, nitric acid and the like, and are used at a concentration of 0.05 to 1.0 N. Examples of the alkalis include sodium hydroxide, potassium hydroxide, lithium hydroxide and the like, and their concentration is in the range of from 1.0 to 10.0 N.

Alternatively, alloy powder may be first treated with an acidic or alkaline solution in a manner as set out above and then with a solution containing a highly conjugated unsaturated compound.

The resultant alloy powder has active metallic nickel deposited on or in the surfaces thereof. The level of the deposition depends on the type of alloy, and it is important to note that the magnetization intensity of the alloy powder be in the afore-defined range as a result of the wet treatment of the alloy powder, thereby causing active metallic nickel to exist in the vicinity of the surfaces thereof.

Moreover, the magnetization intensity may be arbitrarily controlled by nickel plating of alloy powder, or by adding nickel powder to alloy powder. This is especially useful when alloy powder does not contain any nickel therein.

The nickel plating may be carried out by any known procedures such as electroless plating. If nickel powder is used, the amount is in the range of 0.1 to 10 wt % based on the alloy powder and the powder has a size of 0.1 to 10 $\mu$m. This powder is mixed with alloy powder under shear. In this way, active metallic nickel can be deposited on the surfaces of the alloy powder.

Once again, the alloy powder has a magnetization intensity of 0.5 to 6.0 emu/g, a BET specific surface area of 0.15 to 0.7 $m^2/g$, an oxygen content of 0.15 to 1.5 wt %, a size distribution wherein particles having a size of 8 μm or below are contained in an amount of 30 wt % of below, and an average particle size of 10 to 100 μm, low temperature discharge characteristic and high-rate discharge characteristic of an electrode using the powder can be significantly improved. These parameters are interrelated: if one of them is outside the range defined, the significant improvement cannot be expected even if the other parameters are all within the defined ranges. This will be particularly set out in Example appearing hereinafter.

The hydrogen storage alloy powder of the invention can be prepared by initially preparing a hydrogen storage alloy by melting starting alloy components, such as in an electrode furnace, at a temperature ranging from 1300 to 1600° C. and cooling the resultant alloy according to any of known methods although the melting temperature may depend on the types of starting components. The alloy is pulverized in a suitable means such as a ball mill, a jet mill, a pulverizer or the like until the resultant powder has an average size of 10 to 100 μm. Subsequently, the powder is passed through a screen or the like to provide a size distribution wherein particles having a size of 8 μm or below are contained in an amount of 30 (wt) %. The powder is then subjected to wet treatment with an acid or an alkali in a manner as set out before, or subjected to treatment with a solution containing a conjugate unsaturated compound, or is mixed with a nickel powder and/or plated with Ni, so that the magnetization intensity is controlled in the range defined above.

When the alloy powder is applied to as an electrode, the alloy powder and a binder are used in combination. The alloy is dispersed in a binder dissolved in a solvent for the binder to provide a paste or dispersion. Examples of the binder include polyvinyl alcohol, celluloses such as methyl cellulose, polytetrafluoroethylene (PTFE), polyethylene oxide, various types of polymer latices. The paste is filled in a three-dimensional conductive support such as of a nickel foamed body, a nickel fiber body and the like or in a two-dimensional conductive support such as a punching metal, thereby readily obtaining an electrode. The amount of the binder is generally in the range of from 0.1 to 20 parts by weight per 100 parts by weight of the alloy powder.

The present invention is more particularly described by way of example, which should not be construed as limiting the invention thereto.

EXAMPLE AND COMPARATIVE EXAMPLE

Misch metal, Mm, consisting of 33 wt % of La, 47 wt % of Ce, 5 wt % of Pr, and 15 wt % of Nd was provided. Al, Co, Mn, and Ni were, respectively, weighed at atomic ratios of 0.3, 0.70, 0.35 and 3.65 relative to 1.00 of Mm. These elements were melted in a high-frequency melting furnace in an atmosphere of argon to obtain a hydrogen storage alloy. The alloy was subjected to thermal treatment at 1020° C. for 10 hours, followed by pulverization in a ball mill to obtain different types of powders having a content of particles, whose size was 8 μm or below, ranging from 0 to 33 wt % and an average particle size of from 9.0 to 112 μm.

The thus obtained powders having different average sizes and different ratios of particles whose size was 8 μm or below were, respectively, surface treated under different conditions indicated in Table appearing hereinafter wherein a solution of 1 wt % of a highly unsaturated compound and a 0.1N hydrochloric acid aqueous solution and/or a 6N potassium hydroxide aqueous solution were used, and dried. The resultant alloy powders including an untreated powder had a intensity ranging from 0.19 to 6.4 emu/g. It should be noted that a greater value of magnetization intensity leads to a greater amount of metallic nickel present in the vicinity of surfaces, with more active surfaces. The BET specific surface area of these powders ranged from 0.09 to 0.78 $m^2/g$, and the oxygen concentration ranged from 0.9 to 1.61 wt %. The respective characteristics were measured according to the following methods.

Measurement of magnetization intensity: made by an electromagnetic induction method using a sample vibration type magnetometer, Model BHV03.5 series of Riken Electronics Co., Ltd.

Measurement of specific surface area: made by a BET one-point method (i.e. a continuous fluidized bed method) using a fluidization specific surface area automatic measuring apparatus 4AU2 of Yuasa Ionics Co., Ltd.

Measurement of oxygen concentration: made by an IR absorption method using fusion by an inert gas by use of EMGA650 of Horiba Mfg. Co., Ltd.

Measurement of size distribution: made by a laser diffraction method using Microtrack FRA 7998 of (Leeds & Northrup Co.)

Fabrication of Cells 2 g of each of the treated alloy powders was weighed, to which 0.5 g of an aqueous solution of 3 wt % of polyvinyl alcohol (with an average degree of polymerization of 2000 and a degree of saponification of 98 mole %), followed by mixing to obtain a paste. The paste was applied to a fibrous Ni support and dried, followed by compression molding to obtain a negative electrode having a thickness of 0.5 mm. Subsequently, a sintered nickel positive electrode made by a known procedure was provided as a nickel oxide positive electrode, and a polypropylene non-woven fabric was provided as a separator, in which a 6N aqueous potassium hydroxide solution was impregnated. These were used in combination with the positive electrode to obtain a nickel-hydrogen secondary open cell of the negative electrode regulation type. The cell was subjected to measurements of low temperature and a high-rate discharge characteristics according to the following procedures, with the results shown in Table 1.

Evaluation of Low Temperature Characteristic

Each cell was subjected to ten charge and discharge cycles wherein in each cycle, the cell was charged at a constant temperature of 20° C. at 180 mA for 5 hours, and was then discharged at a current of 120 mA until a cell potential was reduced to 1.0 V, followed by further three charge and discharge cycles at a temperature of −10° C.. The average value of the discharge capacity was evaluated as a ratio to the discharge capacity determined at the tenth cycle.

Evaluation of High-rate Discharge Characteristic

Each cell was subjected to ten charge and discharge cycles, each cycle including charging at a constant temperature of 20° C. at 180 mA for 5 hours and discharging at a current of 120 mA until the cell potential was reduced to 1.0 V, followed by discharge at a current of 1,200 mA. This cycle was repeated three times.

The average value of the discharge capacity was evaluated as a ratio to the discharge capacity at the 10th cycle.

The results are shown in Table 1 below.

TABLE 1

| Test No. | Treating Conditions | Average Particle Size (μm) | Ratio of Fine Particles ** (%) | Magnetization Intensity (emu/g) | BET specific surface area ($m^2/g$) | Concentration of oxygen (%) | Low temperature characteristic (%) | High-rate discharge characteristic (%) |
|---|---|---|---|---|---|---|---|---|
| *1 | untreated | 35 | 11 | 0.19 | 0.11 | 0.09 | 45 | 44 |
| 2 | 1) 60° C. × 1 hr. | 35 | 11 | 1.2 | 0.18 | 0.19 | 71 | 75 |
| 3 | 2) 60° C. × 1 hr. | 35 | 11 | 2.4 | 0.30 | 0.39 | 89 | 88 |
| 4 | 3-a) 80° C. × 2 hrs. | 35 | 11 | 0.54 | 0.16 | 0.17 | 70 | 72 |
| 5 | 3-a) 110° C. × 5 hrs. | 35 | 11 | 2.1 | 0.24 | 0.36 | 88 | 89 |
| *6 | 3-a) 110° C. × 5 hrs. | 9.0 | 33 | 3.2 | 0.78 | 1.61 | 51 | 49 |
| 7 | 3-a) 110° C. × 5 hrs. | 10.4 | 28 | 2.6 | 0.67 | 1.46 | 73 | 70 |
| *8 | 3-a) 110° C. × 5 hrs. | 9.5 | 29 | 2.9 | 0.68 | 1.49 | 59 | 58 |
| *9 | 3-a) 110° C. × 5 hrs. | 10.2 | 32 | 2.7 | 0.69 | 1.49 | 59 | 50 |
| *10 | 3-a) 80° C. × 2 hrs. | 9.0 | 33 | 2.5 | 0.56 | 1.20 | 47 | 52 |
| 11 | 3-a) 80° C. × 5 hrs. | 10.4 | 28 | 2.2 | 0.38 | 0.98 | 71 | 71 |
| 12 | 3-b) 110° C. × 5 hrs. | 35 | 11 | 2.0 | 0.25 | 0.37 | 84 | 83 |
| 13 | 3-c) 110° C. × 5 hrs. | 35 | 11 | 1.9 | 0.21 | 0.25 | 83 | 81 |
| 14 | 3-d) 110° C. × 5 hrs. | 35 | 11 | 2.0 | 0.23 | 0.30 | 86 | 86 |
| 15 | 3-e) 110° C. × 5 hrs. | 35 | 11 | 1.7 | 0.21 | 0.27 | 81 | 80 |
| 16 | 3-f) 110° C. × 5 hrs. | 35 | 11 | 2.2 | 0.33 | 0.39 | 89 | 90 |
| 17 | 4) 60° C. × 0.5 hrs. | 35 | 11 | 2.2 | 0.31 | 0.40 | 83 | 84 |
| 18 | 5) 110° C. × 5 hrs. | 35 | 11 | 2.0 | 0.27 | 0.38 | 85 | 85 |
| 19 | 5) 150° C. × 5 hrs. | 35 | 11 | 5.7 | 0.47 | 0.48 | 75 | 75 |
| *20 | 5) 160° C. × 10 hrs. | 35 | 11 | 6.4 | 0.57 | 0.98 | 55 | 52 |
| 21 | 5) 60° C. × 0.5 hrs. | 35 | 11 | 3.2 | 0.46 | 0.51 | 73 | 72 |
| 22 | 7) 110° C. × 5 hrs. | 35 | 11 | 2.7 | 0.42 | 0.44 | 76 | 77 |
| *23 | untreated | 13 | 31 | 0.24 | 0.31 | 0.27 | 49 | 47 |
| *24 | 3-a) 80° C. × 2 hrs. | 13 | 31 | 0.88 | 0.48 | 0.59 | 56 | 54 |
| 25 | 3-a) 80° C. × 2 hrs. | 22 | 15 | 1.7 | 0.28 | 0.42 | 79 | 77 |
| 26 | 3-a) 110° C. × 5 hrs. | 66 | 0 | 1.5 | 0.29 | 0.33 | 74 | 72 |
| 27 | 5) 150° C. × 5 hrs. | 97 | 0 | 1.1 | 0.27 | 0.31 | 72 | 71 |
| *28 | 5) 80° C. × 24 hrs. | 112 | 0 | 0.14 | 0.09 | 0.11 | 31 | 29 |
| *29 | 5) 180° C. × 10 hrs. | 112 | 0 | 0.61 | 0.17 | 0.20 | 52 | 49 |

Note:
*The test numbers marked with "*" are for comparison.
**A ratio of particles whose size is 8 μm or below.

The treating conditions 1), 2), 3-a) to 3-f) and 4) to 7) in the table are those below.

1) A solution containing 1% of a highly conjugated unsaturated compound (i.e. a sulfonate of an azine dye (C.I. Solvent Black 2, $\overline{\text{mW}}$=600) dissolved in a mixture of toluene and methanol at a mixing ratio by volume of 1:1 and hereinafter referred to simply as T) and a hydrogen storage alloy powder were at a ratio by weight of 1:2, agitated and dried.

2) A hydrogen storage alloy powder was treated using a solution containing 1% of T as used in 1) and adjusted in pH to 1.

The conditions 3-a) to 3-f) were those under which a highly conjugated unsaturated compound and an alkali (i.e. KOH) were used for the treatment.

3-a) The procedure of 1) was repeated except that the solution containing 1% of T was rendered alkaline by use of KOH to provide a 6N KOH solution.

3-b) The procedure of 3-a) was repeated using azo dye (C.I. Solvent Black 3 which consists of 2,3-dihydro-2, 2-dimethyl-6-[[1-naphthyl-4-(phenylazo)]azo]-1H-pyrimidine, with $\overline{Mw}$=400) dissolved in methanol.

3-c) The procedure of 3-a) was repeated using, in place of T, amine.quinone condensate (i.e. 1,8-diaminonaphthalene paraquinone condensate dissolved in a mixture of 1-methyl-2-pyrrolidone and methanol, with $\overline{Mw}$=1000).

3-d) The procedure of 3-a) was repeated using, in place of T, azine dye (C.I. Solvent Black 5, with $\overline{Mw}$=500, which is hereinafter referred to simply as D) dissolved in a mixture of toluene and methanol at a mixing ratio by volume of 1:1.

3-e) The procedure of 3-a) was repeated using phenothiazine in place of T.

3-f) The procedure of 3-a) was repeated using a mixture of D and T at a mixing ratio by weight of 1:1 in place of T.

4) Treatment of an alloy powder with an acid and then with a highly conjugated unsaturated compound: an HCl solution having a pH of 1 and a hydrogen storage alloy powder were mixed at a mixing ratio by weight of 10:1 and agitated, followed by mixing the thus treated powder with a solution containing 1% of T at a mixing ratio by weight of 1:2, agitated at room temperature for 1 hour and dried.

5) Treatment of an alloy powder with an alkali and then with a highly conjugated unsaturated compound: a 6N KOH solution and a hydrogen storage alloy powder were mixed at a mixing ratio by weight of 1:2 and agitated, followed by treatment in the same manner as in 4) above.

6) Acid treatment: a HCl solution having a pH of 1 and a hydrogen storage alloy powder were mixed at a ratio by weight of 10:1, agitated and dried.

7) Alkaline treatment: a 6N KOH solution and a hydrogen storage alloy powder were mixed, at a ratio by weight of 1:2, agitated and dried.

When the results of Test No. 1 wherein the alloy was not treated are compared with those of Inventive Test No. 3 and also of Inventive Test Nos. 5, and 12 to 18, it will be seen that the hydrogen storage alloy powders of the invention are good with respect to the low temperature discharge characteristic and the high-rate discharge characteristic.

The results of Test Nos. 23, 24 for comparison reveal that a powder having a small average particle size with a ratio of such fine particles exceeding 30 wt % has an increased specific surface area but is more susceptible to oxidation on or in the surfaces thereof. This eventually leads to a reduced value of magnetization intensity, so that an effectively employed reaction area decreases, thereby not exhibiting good characteristic properties. When this powder is surface treated to increase its magnetization intensity, the capacity lowers and the life is shortened.

The comparison between the results of inventive Test Nos. 5, 7 and those of Test No. 6 for comparison and also between the results of inventive Test Nos. 25 to 27 and the results of Test Nos. 24, 28 for comparison reveals that the discharge characteristic is better when an average size is in the range of 10 to 100 μm and the content of particles whose size is 8 μm or below is in the range of 30 wt % or below. More particularly, where the average size is larger than 10 μm but the content of fine particles with a size of 8 μm or below is larger than 30 wt %, the discharge characteristics, particularly, a high-rate discharge characteristic, are poor (Test No. 9). On the contrary, where the content of the fine particles is less than 30 wt % but the average particle size is smaller than 10 μm, the discharge characteristics become poor (Test No. 8).

The results of Test No. 10 for comparison reveal that when the treatment is effected under conditions sufficient to provide a powder having a BET specific surface area and an oxygen concentration within ranges defined in the present invention, respectively, but the average particle size is smaller than 10 μm and the content of the fine particles with a size of 8 μm or below is larger than 30 wt %, the discharge characteristics are not satisfactory.

The comparison between the results of Test No. 1 and the results of inventive Test Nos. 21, 22 wherein an alloy powder is treated with an acid or alkaline solution reveals that the low temperature characteristic and the high-rate discharge characteristic are better for the alloy powders treated according to the invention. The results of Test Nos. 3, 5 and 12 to 18 reveal that the treatment with a solution containing a highly conjugated unsaturated compound provides better results.

Moreover, the results of Test Nos. 1 to 7, 19 and 20 reveal that the value of magnetization intensity should be in the range of 0.5 to 6 emu/g, the BET specific surface area should be in the range of 0.15 to 0.7 $m^2/g$, and the oxygen concentration should be in the range of 0.15 to 1.5 wt %, within which good low temperature characteristic and high-rate discharge characteristic are obtained.

What is claimed is:

1. A powder which is made of a hydrogen storage alloy and wherein said powder has metallic nickel in or on the surfaces thereof in an amount sufficient to impart a magnetization intensity of 0.5 to 6.0 emu/g thereto, said powder having a specific surface area of 0.15 to 0.7 $m^2/g$ according to a BET adsorption method, an oxygen concentration of 0.15 to 1.5 wt %, and an average particle size of 10 to 100 μm, with a size distribution wherein the content of particles having a size of 8 μm or below is in the range of 30 wt % or below.

2. A powder according to claim 1, wherein the magnetization intensity is in the range of 1.0 to 3.0 emu/g.

3. A powder according to claim 1, wherein the specific surface area is in the range of 0.2 to 0.6 $m^2/g$.

4. A powder according to claim 1, wherein the oxygen concentration is in the range of 0.2 to 0.8 wt %.

5. A powder according to claim 1, wherein the average particle size is in the range of 10 to 70 μm.

6. A powder according to claim 1, wherein said hydrogen storage alloy is of the formula, $(La)_xR_{1-x}(Ni_aM_b)$, wherein R represents an element selected from the group consisting of Ce, Pr and Nd, M represents at least one element selected from the group consisting of Al, Co, Cu, Fe, Mn, Ti and Zr, x is a value of from 0.2 to 1.0, and a+b is a value of 4.0 to 6.0 provided that $0<b\leqq 2.0$.

7. An electrode for secondary cells which comprises the powder of a hydrogen storage alloy defined in claim 1.

8. A powder according to claim 1, wherein said powder has metallic nickel on the surface thereof.

* * * * *